May 25, 1954  C. W. KEUFFEL ET AL  2,679,181
OPTICAL PLUMMET
Filed July 28, 1949  4 Sheets-Sheet 2
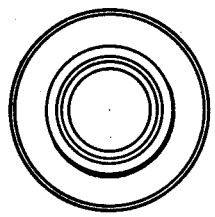
Fig. III
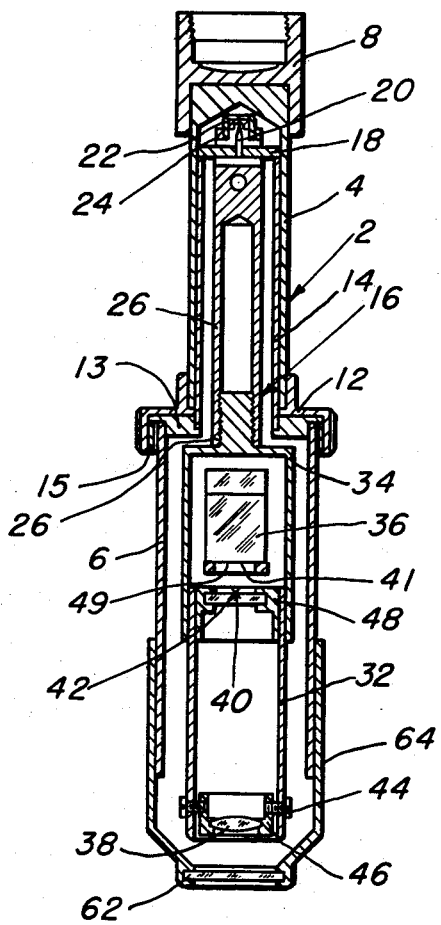
Fig. II
INVENTORS.
CARL W. KEUFFEL
PHILIP KISSAM
BY ALLISTER L. BAKER May 25, 1954 C. W. KEUFFEL ET AL 2,679,181
OPTICAL PLUMMET
Filed July 28, 1949 4 Sheets-Sheet 3
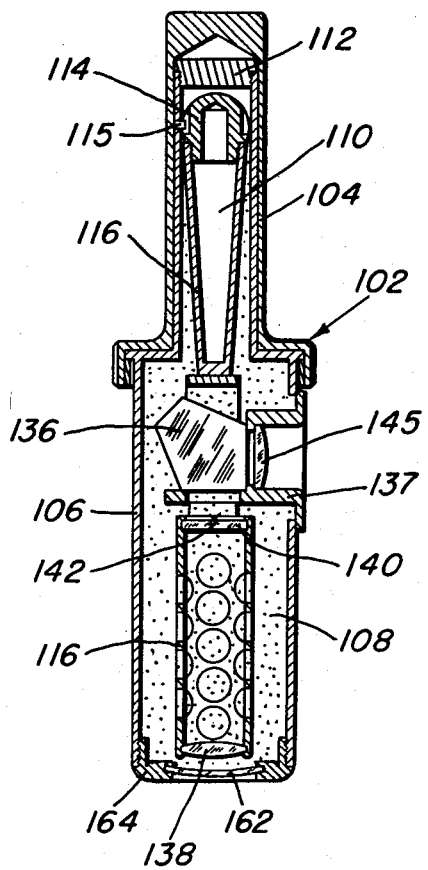
Fig. IV
INVENTORS.
CARL W. KEUFFEL
PHILIP KISSAM
BY ALLISTER L. BAKER
ATTORNEY May 25, 1954  C. W. KEUFFEL ET AL  2,679,181
OPTICAL PLUMMET
Filed July 28, 1949  4 Sheets-Sheet 4
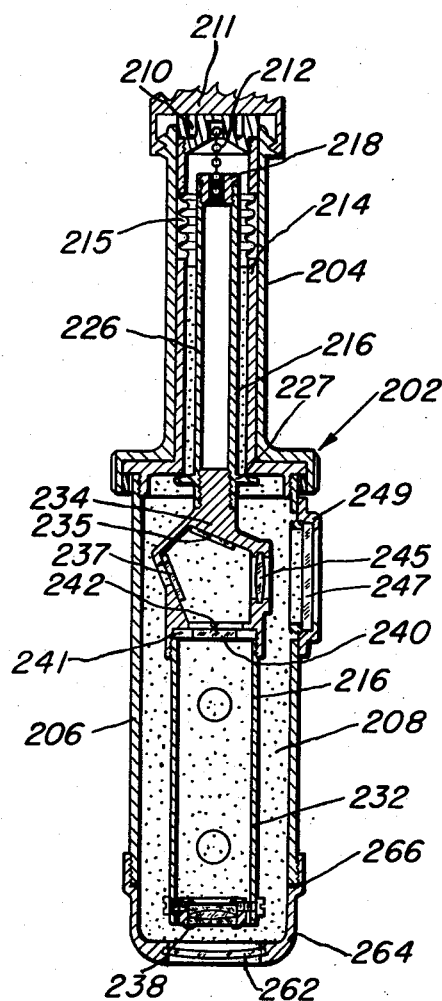
Fig. V
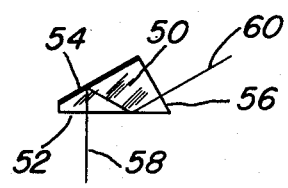
Fig. VI
INVENTORS.
CARL W. KEUFFEL
PHILIP KISSAM
BY ALLISTER L. BAKER
ATTORNEY Patented May 25, 1954

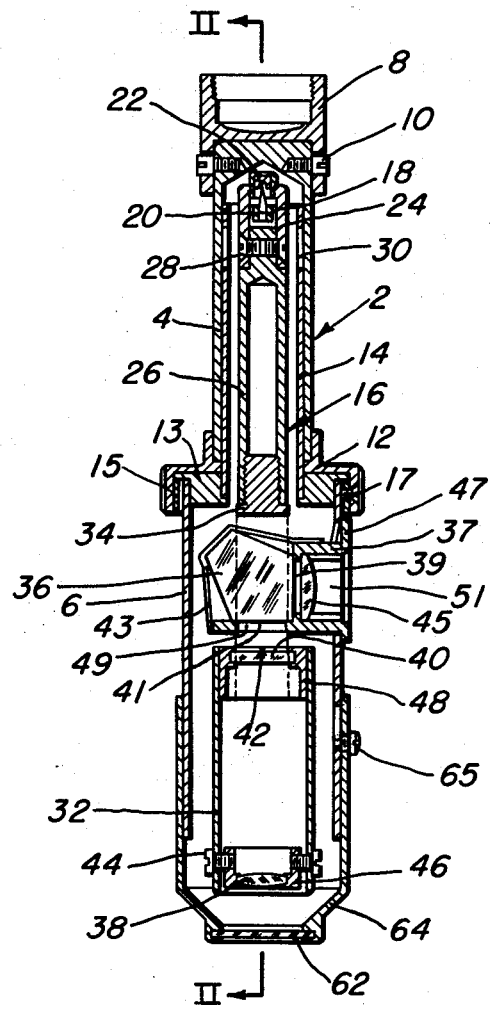
Fig. I

2,679,181

UNITED STATES PATENT OFFICE 2,679,181

OPTICAL PLUMMET

Carl W. Keuffel, Bernardsville, Philip Kissam, Princeton, and Allister L. Baker, Jersey City, N. J., assignors to Keuffel & Esser Company, Hoboken, N. J., a corporation of New Jersey Application July 28, 1949, Serial No. 107,238

10 Claims. (Cl. 88—2.3)

This invention relates to an optical plummet to be used in combination with a surveying instrument or the like. The optical plummet replaces the conventional plumb bob, in which a pointed weight is provided at the end of a string. It has the advantage thereover that it can be more precisely set than the conventional plumb bob. It is unaffected by the wind. It is also more convenient and simple to use and is a compactly contained unit. It has an advantage over other optical devices of this type which have been proposed in that it does not require the instrument to be level in order to function.

The principal objects of the invention are to provide a highly accurate optical plummet which is unaffected by the wind, is self-contained, simple and convenient to use and does not require that the instrument to which it is attached be level in order that it function accurately.

These and other objects of the invention and the means by which they are attained will become more apparent from the following description taken in connection with the accompanying drawings in which:

Figure I is a view in sectional elevation taken through the centerline showing one embodiment of the invention.

Figure II is a view in sectional elevation taken along the line II—II of Figure I.

Figure III is a view in plan of the embodiment shown in Figures I and II.

Figure IV is a view in sectional elevation taken through the centerline showing another embodiment of the invention.

Figure V is a view in sectional elevation taken through the centerline showing a third embodiment of the invention.

Figure VI is a view in diagrammatic elevation showing a different type of reflecting means.

The embodiment of Figures I, II and III and the other two embodiments are generally cylindrical in form although the invention is not necessarily so limited. Referring first to Figure I, the enclosure 2 is of an elongated preferably cylindrical shape and is held in a substantially vertical position. The enclosure 2 is made up principally of metal tubular members 4, 6 and 14. The metal tubular member 4 may be turned from rod stock so that it has an enclosed upper end as shown. A coupling member 8 is provided which is attached to the upper end of the metal tubular member 4 as by the screws 10. The coupling member 8 may be provided with bayonet slots not shown so that the plummet 2 can be removed from the coupling member by turning it. The coupling member 8 is provided with internal threads. These threads are made so that if the cap normally provided at the bottom of a surveying instrument is removed, the coupling member 8 can be made to engage the same threads and to serve to couple or secure the optical plummet to the instrument. This coupling means is preferred but a person skilled in the art could readily devise others which would be within the scope of the invention.

The cap previously referred to is provided at the exact center of the surveying instrument below the "centers." It is preferred that the threads which engage either the cap or the coupling member 8 should be centered on the vertical axis of the surveying instrument which is to be used with the Figure I embodiment of the invention. The threads provided in the coupling member 8 should be centered on the centerline of the optical plummet. If the above conditions are met the centerline of the optical plummet will coincide with the vertical axis of the instrument. Some point on the vertical axis of the instrument should be considered to be a reference point which in surveying must be set vertically over a predetermined point provided on a monument or bench mark imbedded in the ground or provided on a structure of some type. It is the function of the optical plummet to indicate when the reference point is set vertically over the predetermined point. The optical plummet which forms the basis of this invention may also be useful with instruments other than surveying instruments in which case the reference mark of the instrument to which the centerline of the optical plummet must be set may not necessarily be on a vertical axis or centerline of the instrument.

The piece of metal tubing 4 is joined to caplike member 12, by soldering, by means of threads or by means of screws. An inner metal tube 14 is provided for mounting the pendulum member 16 which is free to swing in all directions, with respect to the reference point of the instrument. The disc 13 is suitably joined to the inner metal tube 14 and to the metal tubular member 6. The disc 13 is provided with an annular flange extending beyond the tubular member 6. A short sleeve 15 is secured within the caplike member 12 as by the screws 17. The upper surface of the short sleeve 15 engages the under surface of the annular flange provided on the disc 13. Thus the inner metal tube 14, the disc 13 and the metal tubular member 5 are prevented from translation with respect to tubular member 4 by the caplike member 12 and the short sleeve 15. However, these parts may be rotated with respect to the tubular member so that the optical plummet may be read from any direction in the manner to be described.

The inner metal tube 14 is provided with a projection 18 which carries the pivot pin 20 which is preferably of hardened steel. In this embodiment a pivot bearing 22 which carries the member 16 while permitting it to swing as a pendulum rests on the pivot pin 20. The pivot bearing 22 is preferably a jewel bearing. A reversal of the parts 20 and 22 is equally operable, i. e., a pivot pin could be attached to the pendulum member 16 and a pivot bearing provided on the inner metal tube 14.

The pivot bearing 22 is mounted in an inverted U-shaped member 24 which is attached to the tubular member 26 as by the screws 28. In order to assemble the upper part of the plummet, the U-shaped member 24 carrying the pivot bearing 22 is placed over the pivot pin 20 from above and the upper projection on the tubular member 26 is inserted between the arms of the U-member from below and the screws 28 are inserted through the holes 30 in the inner metal tube 14 to hold the U-shaped member 24 on the tubular member 26. When this much has been done, the inner metal tube 14 may be pushed up into the metal tubing 4 so that it is centered therein and it is then held in position therein by the short sleeve 15 as already described.

A connecting member 34 joins the upper tubular member 26 to the lower tubular member 32 to form the member 16 which is free to swing as a pendulum within the enclosure 2. The connecting member 34 is provided with an opening in order that the motion of the pendulum member 16 is not interfered with by the reflecting means 36. The connecting member 34 is provided with a threaded projection which engages the tubular member 26. It is secured to the lower tubular member 32 by other convenient means not shown.

The optical system of the plummet is made up of the objective 38, the reticle 40 at the focal plane of the objective, the reflecting means 36 and the eyepiece 45. The lower tubular member 32 carries the objective 38 and reticle 40. The objective 38 forms an image on the reticle 40 of an area which includes a point vertically below the reference point of the instrument. The objective 38 or the reticle 40 is made adjustable so that the point which is imaged into coincidence with the index mark 42 provided on the reticle 40 will lie on a vertical straight line extending downward from the reference point of the instrument when the pendulum member 16 is in equilibrium under the action of gravity. The index mark 42 may take a variety of forms, e. g., it may be a small circle or two intersecting straight lines. In the former case the point imaged at the center of the circle will be considered to be the point superimposed on the index mark. In the other case the point imaged at the intersection of the two lines will be considered to be the point superimposed on the index mark. The adjustment can also be made by means of an adjustable weight mounted on the pendulum member 16 and the adjustment of which changes the center of gravity to make the line formed by the index mark and the point on the ground imaged thereon truly vertical or it may even be made by simply bending the tubing 26 slightly until the line of sight becomes vertical.

In the embodiment shown the adjustment is accomplished by the four screws 44 engaging the objective mount 46 through holes provided in the tubular member 32. The reticle 40 is centered in the tubular member 32 by its mount 48 so that the index mark 42 lies on a vertical straight line directed downward from the point of the pivot pin 20 when the pendulum member 16 is in equilibrium under the action of gravity. The point of the pivot pin 20 is also centered so that it lies on the vertical axis of the instrument or on a vertical line extending downward from the reference point of the instrument. It is not essential, however, that the point of the pivot pin 20 lie on the same vertical straight line as the other important points provided the pendulum member is prevented from turning about a vertical axis. It is then only necessary that the point on the ground imaged on the index mark 42 by the objective 38 lie on a vertical straight line which coincides with the vertical axis of the instrument or intersects a reference point of the instrument when the pendulum member 16 is in equilibrium under the action of gravity.

The focal plane at the surface of the reticle 40 may be viewed by means of the reflecting means 36 and the eyepiece 45. The reflecting means 36 is a penta prism in the embodiment shown. It should be realized however, that other types of reflecting means can be used for example a mirror, a combination of mirrors, right angle prism or roof edge or amici prism. The choice of reflecting means depends on the image position desired. With the penta prism or an equivalent combination of mirrors a point on the ground farthest from the observer images at the bottom of the field and a point farthest on the observer's left images on the observer's right, i. e., the image is reversed in both directions. If a single mirror or right angle prism is used the image would be reversed from right to left but not in the other direction. If a roof edge prism is used the image is erect in both directions.

The reflecting means referred to so far are for viewing the focal plane from a direction at a right angle to the vertical. It is also possible to view the reticle from an angle other than a right angle by choosing suitable reflecting means. For example the reflecting means shown in Figure VI may be used. Light from the image passes through the surface 52 of the prism 50, is reflected back from the surface 54, which is provided with a reflecting coating is totally reflected from the surface 52 and finally passes through the surface 56. The principal entering ray 58 is vertical and the principal exiting ray 60 is inclined upward from the horizontal.

Returning to the description of Figure I, the flat prism 36 is mounted on the mount 37. The flat surfaces 39 and 41 of the prism engage flat surfaces on the mount 37. The strap 43 holds the prism 36 in position on the mount 37. The eyepiece 45 is also mounted in the mount 37. The eyepiece may be a single lens as shown or a combination of lenses. A hole is provided in the metal tubing 6 to receive the mount 37. A flange 47 is provided on the mount 37 by means of which the mount is joined to the metal tubing 6. The mount 37 is provided with apertures 49 and 51 which permit the light to pass through the prism 36 and eyepiece 45. By turning the tubular member 6 the aperture 51 can be made to open in a convenient direction for reading the plummet, e. g., a direction not in line with a tripod leg.

A window 62 is provided at the base of the plummet to permit light from the ground to reach the objective 38. The window 62 is mounted in the window mount 64 which is tubular in form and fits over the metal tubular member 6. The window mount 64 fits over the metal tubing 6 so that it may slide thereover and be moved in the vertical direction. The window mount 64 has an inner conical surface which engages the objective end of the pendulum member when the mount is moved upwardly. The upper end of the tubing member 4 is also provided with an inner conical surface for engaging the upper end of the pendulum member. When the plummet is not in use the objective mount 64 may be pushed upward to lift the pivot bearing 22 off the pivot 20 and hold the pendulum member 16 between these conical surfaces so that it cannot vibrate. This protects the plummet from damage which might result if the pendulum were allowed to swing violently during transportation of the instrument. When it is desired to use the instrument it is only necessary to pull the window mount 64 downward to permit the pendulum member to swing on the pivot 20. A stop as for example the screw 65 in Figure I limiting the downward motion of the objective mount 64 may also be provided.

In using the optical plummet, the surveying instrument is mounted on a tripod in the conventional manner, the plummet is attached to a surveying instrument as has been described. The clearance between the pendulum member 16 and the enclosure is made great enough so that when the tripod is adjusted so that the instrument appears level to the eye, the pendulum member 16 will be freely suspended, i. e., it will not touch the enclosure 2. The operator looks through the optical plummet and shifts the instrument by moving it on the tripod plate until the predetermined point is seen through the optical plummet and appears to be superimposed on the index mark when the pendulum member comes to rest and is in equilibrium under the action of gravity. The instrument may then be accurately levelled and is then ready to be used for sighting distant points, measuring angles, stadia readings, etc.

Another embodiment of the invention is shown in Figure IV. In this embodiment the enclosure 102 is made up of two principal metal tubular members 104 and 106. The tubular member 106 extends up into the tubing member 104 and may be secured in position therein by means similar to that described in connection with Figure I which will permit rotation of the tubular member 106. The bottom of the tubular member 106 is closed off by the window 162 and the window mount 164. Reflecting means 136 and an eyepiece 145 are mounted in the prism mount 137 which may be the same as described in connection with Figure I. The alternative reflecting means referred to in the description of Figures I and IV are equally useful in this embodiment.

In the Figure IV embodiment, the window 162, window mount 164, prism mount 137, the eyepiece 145 and the metal tubing member 106 must be joined together in a leakproof manner to hold the fluid 108. The fluid 108 buoyantly supports the member 116 which is free to swing as a pendulum within the enclosure 102. The pendulum member 116 is provided with an internal open space 110 which lowers the specific gravity of the member just sufficiently so that it is buoyantly held free of the top and bottom internal surfaces of the enclosure 102. The metal tubing member 106 may be sealed with a cap 112. This seal of the cap should be vaportight if the fluid 108 is volatile. The pendulum member 116 is provided with a ball-like top 114 with a diameter just slightly smaller than the inside diameter of the top portion of the metal tubing member 106. The ball-like top 114 permits the pendulum member 116 to swing in any direction about the center of the ball but does not permit any appreciable translation of the pendulum member. The ball-like top 114 is keyed to the tubing member 106 as by the pin 115 to prevent the pendulum member 116 from turning about its vertical axis which would introduce an error if the center of the ball is not vertically below the reference point of the instrument.

The window 162 is preferably spherical in form and its surfaces have a radius of curvature equal to the distance from the pivot point (in this case the center of the ball-like top 114) to the surface. Due to the fact that the inner surface of the window is in contact with the liquid 108 while the outer surface is in contact with air, a planoparallel window introduces an error when it is inclined to the horizontal. No appreciable error is introduced if both sides of the mirror contact the same medium so that in an embodiment such as is shown in Figure I either a planoparallel or a spherical window may be used.

The lower part of the pendulum member 116 may be substantially as described for the pendulum member of Figure I, i. e., it carries an objective 138 and a reticle 140 having an index mark 142 and is provided with an aperture which permits it to swing freely past the reflecting means 136. The space between the objective 138 and the reticle 140 may either be sealed to keep out the fluid 108 or holes may be provided as shown to permit the fluid 108 to enter. The objective 138 must be designed to operate with either one or both of its surfaces in contact with the fluid 108 and account must be taken of the fact that the fluid 108 fills the space between the reticle 140 and the reflecting means 136.

The fluid 108 may serve an additional function in the embodiment of Figure II i. e., it may serve to damp the swings of the pendulum member 116 so that it will come to rest quickly in use. A wide variety of fluids such as butanol, heptane and mineral oil may be used depending on the degree of damping and other properties sought. A fluid may also be used in the embodiments of Figure I or Figure V for damping purposes or other damping means such as magnetic damping means may be used.

The embodiment of Figure IV may be mounted to a surveying instrument by a coupling member such as member 8 in Figure I.

In the embodiment of Figure V the enclosure 202 is formed from a metal tubing member 204, a metal tubing member 206 and an inner metal tube 214 joined together as already described in connection with Figures I and IV or in any convenient manner. The pendulum member 216 is supported to the cap 219 by a short length of common flexible supporting material 212. The flexible supporting material 212 may be a fine chain, wire, string or the like and joined to the cap 210 and the cap 218 by any convenient means such as soldering or the like.

The cap 218 is provided in the upper tubular member 220 of the pendulum member 216. The lower tubular member 232 is joined to the upper tubular member 226 by the connecting member 234. In this embodiment, the connecting member 234 also carries the reflecting means which consists of the mirrors 235 and 237. However, the reflecting means may take any of the forms already described. The eyepiece 245 is also carried by the connecting member 234. A window 247 is provided in the side of the metal lower tubing member 206 and is held in position by the window mount 249.

The lower tubular member 232 of the pendulum member 215 is threadably joined to the connecting member 234 as shown. It carries the objective 238 and the reticle 240 provided with the index mark 242 is held in position between it and the connecting member 234. The reticle 240 is provided with slots 241 which permit air to pass out of the tubular member 232 and keep the reticle 240 free of air bubbles. The window 262 is provided at the bottom of the plummet and is mounted in a window mount 264. A gasket 266 is provided between the window mount 264 and the metal tubing member 206 to prevent leakage of a liquid 208 provided in the enclosure 202. In this embodiment the liquid 208 is provided only for purposes of damping the swing of the pendulum member 216. The space within the tubular members 232 and 226 may or may not be filled with the liquid 208 but the optical parts should be designed accordingly. However, the pendulum member 216 should not be so light that it will float in the liquid 208 instead of swinging from the flexible supporting means 212.

In the embodiments of Figures IV and V it is not practical to use the means of holding the pendulum member in order to prevent its vibration which was described in connection with Figure I because it would probably interfere with the sealing of the liquid. Such means are not quite as important in these embodiments because the liquid cushions the motion of the pendulum anyway. The cushioning effect could be increased by providing pieces of rubber or the like secured to the inside of the enclosure 202. The pendulum member would contact these pieces at the extremes of its swing and damage of the pendulum member due to rough handling would be avoided.

However, suitable means is provided in the embodiment of Fig. V to hold the pendulum positively when not in use. The tubing member 214 is divided into two parts as shown and a compressible member in the form of the bellows 215 is provided between the parts. The bellows 215 preferably of metal is joined to the tubing member 214 in a leakproof manner as by soldering or brazing. Threads are provided on the outside of the metal tubing member 204 which engage the connecting member 211. The connecting member 211 may be of the type shown in Fig. I or of another type but is preferably suitable for joining the plummet to an instrument. When the tubing member 204 is turned with respect to the connecting member 211 it may be raised or lowered with respect to the cap 210 carrying with it the lower part of the tubing member 214 and compressing or releasing the compression on the bellows 215. The tubing member 204 is shown in its lowest position in which stop means in the form of the flange 227 having an upper conical surface is in contact with the flange provided at the bottom of the tubing member 214. When the tubing member 204 is raised however the flange 227 clears the enclosure and the pendulum member is free to swing.

In the embodiment shown in Fig. V the pendulum is normally automatically released when the tubing member 204 is screwed into the connecting member 211. Since the connecting member 211 is normally threaded to an instrument carried on a tripod, the pendulum will normally be free to swing when the optical plummet is mounted on the instrument and tripod. When the plummet is detached the pendulum automatically is clamped so that it cannot swing. Some surveyors may prefer to leave the plummet secured to the instrument and tripod and carry it therewith from place to place as they go about their work.

In this case it may be preferable to provide a clamping means for the pendulum which may be operated independently of the means used to secure the plummet to the surveying instrument. Such means may still make use of an expansible metal bellows to permit axial motion between the pendulum member and part of its enclosure. Instead of moving the pendulum with respect to the lower part of the enclosure, it is equally possible to move the lower part of the enclosure (members 214 and 206) with respect to the pendulum. It may then be necessary to reverse the action of the stop means 227. This could be made to clear the member 214 completely and stop means provided on the member 206 below the flange 227 so that when members 214 and 206 are moved upward with respect to the pendulum member, the pendulum member will be clamped. A bayonet catch may then be provided between members 204 and 214 to hold members 206 and 214 in their upper position and members 206 and 214 may be free to rotate inside member 204 in their lower position by providing an annular groove for the bayonet catch in this position.

In the embodiment of Fig. V, the objective 238 is a triplet lens. However, an objective in the form of a single lens would be equally as useful in this embodiment as it is in the embodiment of Fig. IV. The triplet lens 238 is made with two substantially plano-concave lenses of a low index glass and double convex lens of a high index glass. Thus substantially all of the focussing effect is obtained from the double convex lens of high index glass. The refraction at the lower planoliquid interface is always compensated by the refraction at the upper planoliquid interface. This is true even if the index of refraction of the liquid changes as might occur if the temperature changes. It should be realized that the instrument may be used under varying temperature conditions ranging from arctic to tropical conditions. The purpose of the triplet lens objective is therefore to substantially eliminate the effect of changes in index of refraction of the damping liquid due to temperature changes which might otherwise cause parallax at the focal plane 242.

Other forms of objective for the same purpose may also be used. For example a triplet lens having two plano-convex lenses of a high index glass separated by a double concave lens of a low index glass could be used. Another possibility is the use of two plano-convex lenses separated by an air space which is sealed against the entrance of the damping liquid. If the entire space between the objective 238 and the reticle 240 is filled with air and sealed against the entrance of the damping liquid, it is only necessary to provide a planosurface on the lower side of the objective in contact with the damping liquid.

It will be apparent that certain of the features described in connection with one embodiment will be equally useful in other embodiments. It is not intended that such features be considered to be limited to one embodiment only. The parts of the plummet have been described as being made of metal although other suitable materials may be used. For example it might be desirable to enclose a liquid damped pendulum member in a glass envelope. The three embodiments illustrated all provide an enclosure for the pendulum member. This is desirable to shield the pendulum member from the wind and in some embodiments to carry a damping fluid. However, a useful optical plummet can be made within the scope of the invention in which no enclosure is provided for the pendulum member. Such a device could be made to offer little resistance to the wind and could be made to come to rest quicker than an ordinary plumb bob.

In Fig. V the reflecting means and eyepiece are both carried by the pendulum member while in Figures I and IV they are not. Other arrangements of the optical parts may be devised by a person skilled in the art which should be considered to be within the scope of the invention. For example, the reflecting means could be provided between the objective and the reticle. No limitation of the invention is intended other than that imposed by the appended claims.

What is claimed is:

1. An optical plummet to indicate when a reference point is vertically over a predetermined point comprising an enclosure, a cap at the top of said enclosure, a compressible member joining said cap to said enclosure, a pendulum member suspended from said cap within said enclosure, stop means on said pendulum member engaging said enclosure when said compressible member is in uncompressed position and clearing said enclosure when said compressible member is in compressed position thereby leaving said pendulum member free to swing with respect to the reference point, a liquid in said enclosure to damp the motion of said pendulum member, an optical system including an objective carried by said pendulum member to image a point vertically below the reference point, a reticle carried by said pendulum member at the focal plane of said objective having an index mark and means for viewing said focal plane so that when said pendulum member is at rest in equilibrium under the action of gravity a point which is vertically below the reference point will appear to be superimposed on said index mark.

2. An optical plummet to indicate when a reference point is vertically over a predetermined point comprising an enclosure, a compressible bellows joining two parts of said enclosure, a pendulum member within said enclosure suspended from one of the parts thereof, said compressible bellows permitting axial movement between the parts of said enclosure and between the pendulum member and one of the parts of said enclosure, means on said pendulum member and on the part of said enclosure which is movable with respect thereto which prevent the swinging of the pendulum member for one axial position and permit the swinging of the pendulum member with respect to the reference point for another axial position, a liquid in said enclosure to damp the motion of said pendulum member, an optical system including an objective carried by said pendulum member to image a point vertically below the reference point, a reticle carried by said pendulum member at the focal plane of said objective having an index mark and means for viewing said focal plane so that when said pendulum member is at rest in equilibrium under the action of gravity a point which is vertically below the reference point will appear to be superimposed on said index mark.

3. An optical plummet to indicate when a reference point is vertically over a a predetermined point comprising a substantially vertical elongated enclosure, means for securing said enclosure under a surveying instrument, said enclosure being rotatable about a vertical axis with respect to said surveying instrument, a hollow pendulum member suspended on a short length of common flexible supporting material within said enclosure free to swing with respect to the reference point, means mounted on one of said pendulum or enclosure for preventing the pendulum from hitting the walls of the enclosure, a liquid in said enclosure for damping said pendulum member to bring it quickly to rest in its equilibrium position under the action of gravity, an objective lens carried by said pendulum member near the lower end thereof to image a point vertically below the reference point, said objective lens comprising a double convex lens of high index glass cemented between two lenses of low index glass, the exposed surfaces of said latter two lenses being in contact with said liquid and being substantially plano so that substantially all of the focusing effect is obtained from the double convex lens of high index glass, a window at the bottom of said enclosure below said objective lens and having spherical surfaces with radii of curvature substantially equal to the distance from the spherical surfaces to the point about which the pendulum member is free to swing, a reticle having an index mark mounted on said pendulum member above said objective lens, a first reflecting surface carried by said pendulum member above said reticle facing obliquely downward and toward the wall of said enclosure, a second reflecting surface carried by said pendulum member below said first reflecting surface and above said reticle facing obliquely upward and toward the opposite side of the wall of said enclosure, an eyepiece carried by said pendulum member above said reticle in the path of light from said second reflecting surface, a window in the wall of said enclosure in alignment with said eyepiece for viewing said reticle from any direction so that when said pendulum member is at rest in equilibrium under the action of gravity a point which is vertically below the reference point will appear to be superimposed on said index mark of said reticle.

4. An optical plummet to indicate when a reference point is vertically over a predetermined point comprising a substantially vertical elongated enclosure, means for securing said enclosure under a surveying instrument, said enclosure being rotatable about a vertical axis with respect to said surveying instrument, a hollow pendulum member suspended by substantially frictionless means within said enclosure free to swing with respect to the reference point, means mounted on one of said pendulum or said enclosure preventing the pendulum from hitting the walls of the enclosure, a liquid in said enclosure for damping said pendulum member to bring it quickly to rest in its equilibrium position under the action of gravity, an objective lens carried by said pendulum member near the lower end thereof to image a point vertically below the reference point, said objective lens comprising a double convex lens of high index glass cemented between two lenses of low index glass, the exposed surfaces of said latter two lenses being in contact with said liquid and being substantially plano so that substantially all the focusing effect is obtained from the double convex lens of high index glass, a window at the bottom of said enclosure below said objective lens, a reticle having an index mark mounted on said pendulum member above said objective lens, a first reflecting surface carried by said pendulum member below said first reflecting surface and above said reticle facing obliquely upward and toward the opposite side of the wall of said enclosure, an eyepiece carried by said pendulum member above said reticle in the path of light from said second reflecting surface, a window in the wall of said enclosure in alignment with said eyepiece for viewing said reticle from any direction so that when said pendulum member is at rest in equilibrium under the action of gravity a point which is vertically below the reference point will appear to be superimposed on said index mark of said reticle.

5. An optical plummet to indicate when a reference point is vertically over a predetermined point comprising a substantially vertical elongated enclosure, means for securing said enclosure under a surveying instrument, said enclosure being rotatable about a vertical axis with respect to said surveying instrument, a hollow pendulum member suspended on a short length of common flexible supporting material within said enclosure free to swing with respect to the reference point, means mounted on one of said pendulum member or enclosure for preventing the pendulum from hitting the walls of the enclosure, a liquid in said enclosure for damping said pendulum member to bring it quickly to rest in its equilibrium position under the action of gravity, an objective lens carried by said pendulum member near the lower end thereof to image a point vertically below the reference point, said objective lens comprising a double convex lens of high index glass cemented between two lenses of low index glass, the exposed surfaces of said latter two lenses being in contact with said liquid and being substantially plano so that substantially all the focusing effect is obtained from the double convex lens of high index glass, a window at the bottom of said enclosure below said objective lens, a reticle having an index mark mounted on said pendulum member above said objective lens, reflecting means carried by said pendulum member above said reticle and an eyepiece carried by said pendulum member above said reticle in the path of light from said reflecting means, a window in the wall of said enclosure in alignment with said eyepiece for viewing said reticle from any direction so that when said pendulum member is at rest in equilibrium under the action of gravity a point which is vertically below the reference point will appear to be superimposed on said index mark of said reticle.

6. An optical plummet to indicate when a reference point is vertically over a predetermined point comprising a substantially vertical elongated enclosure, means for securing said enclosure under a surveying instrument, said enclosure being rotatable about a vertical axis with respect to said surveying instrument, a hollow pendulum member suspended on a short length of common flexible supporting material within said enclosure free to swing with respect to the reference point, means mounted on one of said pendulum or enclosure preventing the pendulum from hitting the walls of the enclosure, means for damping said pendulum member to bring it quickly to rest in its equilibrium position under the action of gravity, an objective lens carried by said pendulum member near the lower end thereof to image a point vertically below the reference point, a window at the bottom of said enclosure below said objective lens, a reticle having an index mark mounted on said pendulum member above said objective lens and in the focal plane thereof, a first reflecting surface carried by said pendulum member above said reticle facing obliquely upward and toward the opposite side of the wall of said enclosure, an eyepiece carried by said pendulum member above said reticle in the path of light from said second reflecting surface and a window in the wall of said enclosure in alignment with said eyepiece for viewing said reticle from any direction so that when said pendulum member is at rest in equilibrium under the action of gravity a point which is vertically below the reference point will appear to be superimposed on said index mark of said reticle.

7. An optical plummet to indicate when a reference point is vertically over a predetermined point comprising a substantially vertical elongated enclosure, means for securing said enclosure under a surveying instrument, a hollow pendulum member suspended on a short length of common flexible supporting material within said enclosure free to swing with respect to the reference point, means mounted on one of said pendulum or enclosure for preventing the pendulum from hitting the walls of the enclosure, a liquid in said enclosure for damping said pendulum member to bring it quickly to rest in its equilibrium position under the action of gravity, an objective lens carried by said pendulum member near the lower end thereof to image a point vertically below the reference point, said objective lens comprising a double convex lens of high index glass cemented between two lenses of low index glass, the exposed surfaces of said latter two lenses being in contact with said liquid and being substantially plano so that substantially all the focusing effect is obtained from the double convex lens of high index glass, a window at the bottom of said enclosure below said objective lens, a reticle having an index mark mounted on said pendulum member above said objective lens, a first reflecting surface carried by said pendulum member above said reticle facing obliquely downward and toward the wall of said enclosure, a second reflecting surface carried by said pendulum member below said first reflecting surface and above said reticle toward the opposite side of the wall of said enclosure, an eyepiece carried by said pendulum member above said reticle in the path of light from said second reflecting surface, a window in the wall of said enclosure in alignment with said eyepiece for viewing said reticle so that when said pendulum member is at rest in equilibrium under the action of gravity a point which is vertically below the reference point will appear to be superimposed on said index mark of said reticle.

8. An optical plummet to indicate when a reference point is vertically over a predetermined point comprising a substantially vertical elongated enclosure, means for securing said enclosure under a surveying instrument, said enclosure being rotatable about a vertical axis with respect to said surveying instrument, a hollow pendulum member suspended on a short length of common flexible supporting material within said enclosure free to swing with respect to the reference point, means mounted on one of said pendulum member or enclosure preventing the pendulum from hitting the walls of the enclosure, a liquid in said enclosure for damping said pendulum member to bring it quickly to rest in its equilibrium position under the action of gravity, an objective lens carried by said pendulum member near the lower end thereof to image a point vertically below the reference point, the surface of said objective lens in contact with said liquid being substantially plano, a window at the bottom of said enclosure below said objective lens, a reticle having an index mark mounted on said pendulum member above said objective lens, a first reflecting surface carried by said pendulum member above said reticle facing obliquely downward and toward the wall of said enclosure, a second reflecting surface carried by said pendulum member below said first reflecting surface and above said reticle facing obliquely toward the opposite side of the wall of said enclosure, an eyepiece carried by said pendulum member above said reticle in the path of light from said second reflecting surface, a window in the wall of said enclosure in alignment with said eyepiece for viewing said reticle from any direction so that when said pendulum member is at rest in equilibrium under the action of gravity a point which is vertically below the reference point will appear to be superimposed on said index mark of said reticle.

9. An optical plummet to indicate when a reference point is vertically over a predetermined point comprising a substantially vertical elongated enclosure, means for securing said enclosure under a surveying instrument, said enclosure being rotatable about a vertical axis with respect to said surveying instrument, a hollow pendulum member suspended on a short length of common flexible supporting material within said enclosure free to swing with respect to the reference point, means mounted on one of said pendulums or enclosure for preventing the pendulum from hitting the walls of the enclosure, a liquid in said enclosure for damping said pendulum member to bring it quickly to rest in its equilibrium position under the action of gravity, an objective lens carried by said pendulum member near the lower end thereof to image a point vertically below the reference point, a window at the bottom of said enclosure below said objective lens, a reticle having an index mark mounted on said pendulum member above said objective lens in the focal plane thereof, a first reflecting surface carried by said pendulum member above said reticle facing obliquely downward and toward the wall of said enclosure, a second reflecting surface carried by said pendulum member below said first reflecting surface and above said reticle facing obliquely upward and toward the opposite side of the wall of said enclosure, an eyepiece carried by said pendulum member above said reticle in the path of light from said second reflecting surface, a window in the wall of said enclosure in alignment with said eyepiece for viewing said reticle from any direction so that when said pendulum member is at rest in equilibrium under the action of gravity a point which is vertically below the reference point will appear to be superimposed on said index mark of said reticle.

10. An optical plummet to indicate when a reference point is vertically over a predetermined point comprising a substantially vertical elongated enclosure, means for securing said enclosure under a surveying instrument, said enclosure being rotatable about a vertictal axis with respect to said surveying instrument, a hollow pendulum member suspended on a short length of common flexible supporting material within said enclosure free to swing with respect to the reference point, a liquid in said enclosure for damping said pendulum member to bring it quickly to rest in its equilibrium position under the action of gravity, an objective lens carried by said pendulum member near the lower end thereof to image a point vertically below the reference point, said objective lens comprising a double convex lens of high index glass cemented between two lenses of low index glass, the exposed surfaces of said latter two lenses being in contact with said liquid and being substantially plano so that substantially all the focusing effect is obtained from the double convex lens of high index glass, a window at the bottom of said enclosure below said objective lens, a reticle having an index mark mounted on said pendulum member above said objective lens, a first reflecting surface carried by said pendulum member above said reticle facing obliquely downward and toward the wall of said enclosure, a second reflecting surface carried by said pendulum member above said first reflecting surface and above said reticle facing obliquely upward and toward the opposite side of the wall of said enclosure, an eyepiece carried by said pendulum member above said reticle in the path of light from said second reflecting surface, a window in the wall of said enclosure in alignment with said eyepiece for viewing said reticle from any direction so that when said pendulum member is at rest in equilibrium under the action of gravity a point which is vertically below the reference point will appear to be superimposed on said index mark of said reticle.

References Cited in the file of this patent

UNITED STATES PATENTS

| Number | Name | Date |
| --- | --- | --- |
| 928,477 | Sloggett | July 20, 1909 |
| 940,329 | Krell | Nov. 16, 1909 |
| 973,062 | Mayo | Oct. 18, 1910 |
| 1,028,224 | Kohler | June 4, 1912 |
| 1,121,309 | Thompson | Dec. 15, 1914 |
| 1,722,209 | Gordon | July 23, 1929 |
| 1,891,641 | Habel | Dec. 20, 1932 |
| 2,088,262 | Grano | July 27, 1937 |
| 2,399,014 | Foster | Apr. 23, 1946 |
| 2,485,558 | Braunlich | Oct. 25, 1949 |

FOREIGN PATENTS

| Number | Country | Date |
| --- | --- | --- |
| 141,850 | Great Britain | Apr. 29, 1920 |